United States Patent [19]

Gebhart

[11] 4,308,852
[45] Jan. 5, 1982

[54] APPARATUS FOR SAWING DIFFERENT MATERIALS

[76] Inventor: Siegfried Gebhart, Tobelstadel, 7971 Aichstetten, Fed. Rep. of Germany

[21] Appl. No.: 161,102

[22] Filed: Jun. 19, 1980

[30] Foreign Application Priority Data

Jun. 23, 1979 [DE] Fed. Rep. of Germany ....... 2925600
Jun. 23, 1979 [DE] Fed. Rep. of Germany ....... 2925401
Oct. 26, 1979 [DE] Fed. Rep. of Germany ....... 2943299

[51] Int. Cl.³ .............................................. B28D 1/04
[52] U.S. Cl. ................................ 125/16 R; 83/435.1; 83/776; 83/780
[58] Field of Search ................. 83/776, 778, 779, 780, 83/423, 435.1; 125/16 R, 16 L, 16 F, 35, 12

[56] References Cited

U.S. PATENT DOCUMENTS

| 98,013 | 12/1869 | Barlow | 83/780 |
| 337,661 | 3/1886 | Campbell | 125/16 R |
| 864,750 | 8/1907 | Burpee | 83/435.1 |
| 2,712,307 | 7/1955 | Stalheim | 125/16 R |
| 4,030,394 | 6/1977 | Kistner | 83/435.1 |

Primary Examiner—Harold D. Whitehead
Attorney, Agent, or Firm—Benoit Law Corporation

[57] ABSTRACT

An apparatus for sawing different kinds of materials has a supporting frame including a girder-type construction defining an opening for the feed-through of materials to be cut in longitudinal direction by a saw blade. A supporting platform for materials to be cut includes a carriage platform for materials to be cut includes a carriage displaceable in longitudinal direction, and a clamping arrangement for materials to be cut is located on the carriage. At least one supporting bracket is positioned laterally of the saw blade in front and back regions of the frame and mounted on said carriage, and an upper and lower cross-beam is provided for each supporting bracket, with each lower cross-beam being arranged at a distance from the carrier. Vertically movable rods are arranged between the upper and lower cross-beams and carry a clamping device for materials to be cut. The saw blades may be slanted for increased efficiency and durability.

23 Claims, 13 Drawing Figures

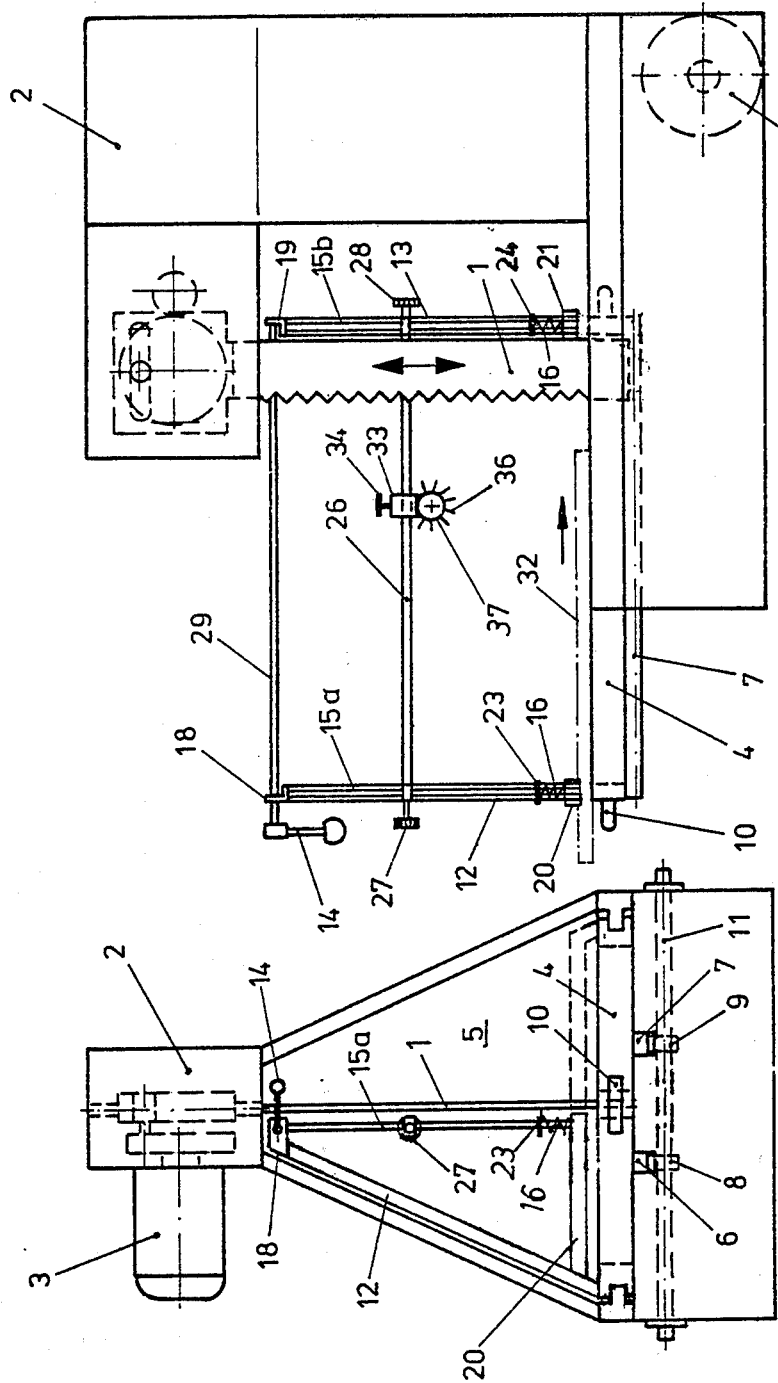

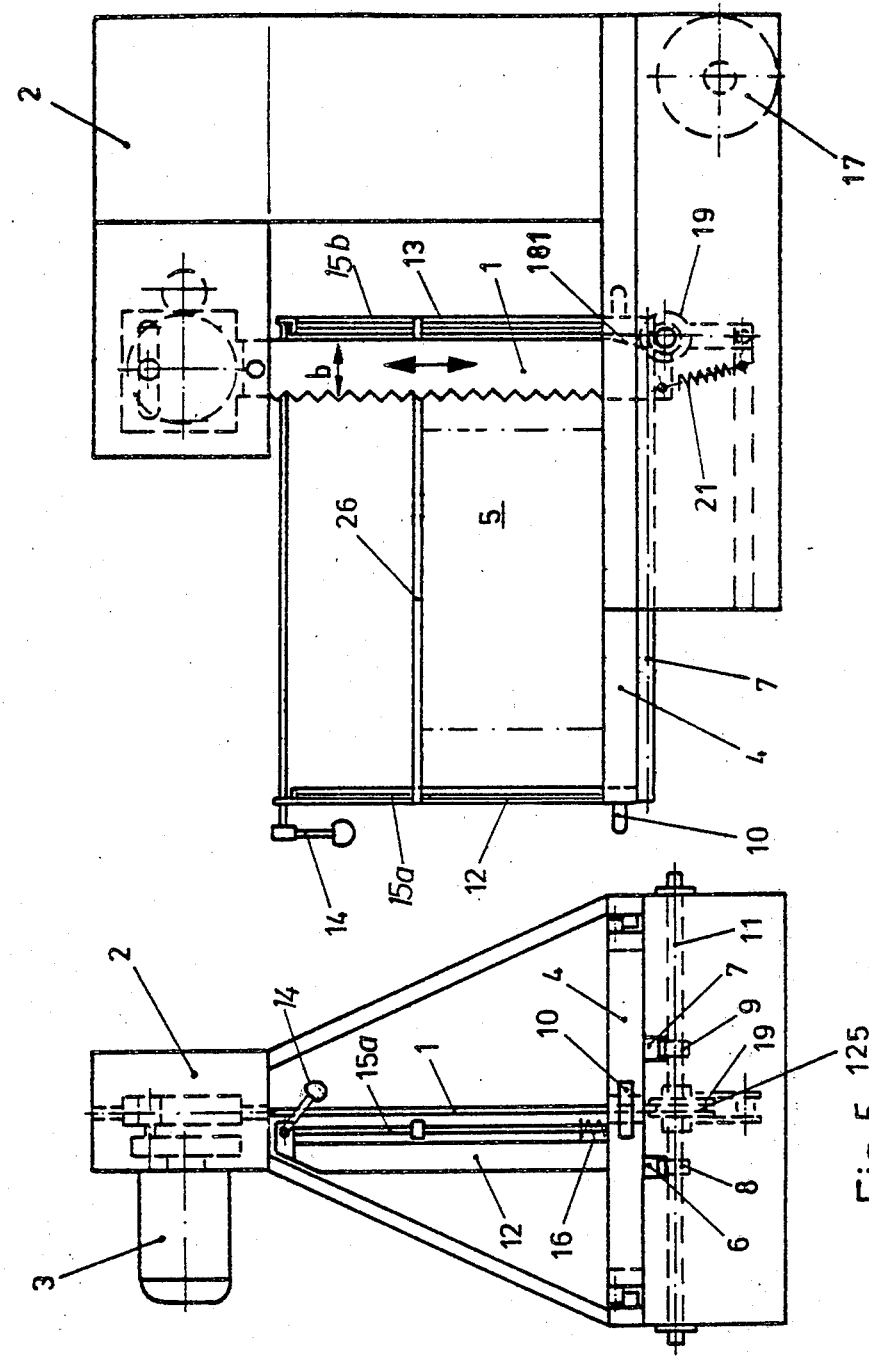

APPARATUS FOR SAWING DIFFERENT MATERIALS

BACKGROUND OF THE INVENTION

Field of the Invention

The subject invention relates to sawing apparatus and systems and, more particularly, to apparatus for sawing different materials, including building materials, such as bricks, walls, stone plates, wood, pipes and the like. By way of example, the sawing apparatus may be of a type including a reciprocating saw blade mounted in a housing or frame and driven by a motor, and including a supporting platform for the material to be cut.

Though the utility of the subject invention is not limited to any particular field, it may be noted that the necessity of separating or cutting materials, to reduce them in size or provide apertures or openings therein, is particularly prevalent at building or construction sites. For example, it is frequently necessary to reduce walls or bricks as to height, width and length, at corners, in window and door areas, in ceiling regions and at gables, where even angle cuts are required at times. Moreover, boards and planking often have to be cut lengthwise and transversely to specific dimensions required in concrete casting and molding work.

For lack of suitable equipment, bricks and wall stones typically have been reduced in size by means of a hammer or voids in walls were filled with stone fragments. Such prior-art methods frequently produced insulating gaps or defects, particularly in work with wall stones equipped with a temperature insulating layer, such as, for instance, shown in German Pat. No. 1 708 765. Moreover, such practices eventuated higher material costs. In particular, bricks and stones frequently became useless during an attempted size diminution and many worthless fragments resulted.

For these reasons, a saw for stone work pieces was proposed in the German Utility Model No. 77 02 782. That saw was, however, only suitable for sawing stones of small hardness or rigidity. Stones of large hardness or rigidity cannot be handled by that prior saw. Moreover, cutting with a saw adjustable in a corresponding mount is awkward and demanding in effort.

Also, that prior proposal is only conditionally suitable for cutting other materials, such as wood, for example. Long boards, for instance, cannot be cut longitudinally thereby.

Furthermore, the there proposed means for clamping stones to be cut are not sufficiently stable and capable of withstanding larger forces.

In the case of reciprocal and similar saws, saw blades generally have bits or cutting plates brazed onto a foundation body. This raises the danger that the bits or cutting plates fracture or separate from their foundation during the return stroke, especially if rough or hard substances, such as present in building materials, are being cut. For this reason, special saw blades provided with two rows of cutting plates arranged for bidirectional cutting operations have been employed. Such special blades, disadvantageously, are very complex in their manufacture, and therefore rather expensive.

SUMMARY OF THE INVENTION

It is a general object of this invention to meet the needs and overcome the disadvantages expressed or implicit in the above disclosure statement or in other parts hereof.

It is a related object of this invention to provide improved sawing methods and equipment, including improved saws and saw blades.

It is a germane object of this invention to provide improved reciprocal saws.

It is a specific object of this invention to provide universally applicable sawing apparatus for executing longitudinal and transverse cuts and even angle cuts, in large and long work prices or parts of different materials.

It is also a specific object of this invention to provide a reciprocal saw capable of cutting rough and hard materials even with relatively simple saw blades.

Other objects of the invention will become apparent in the further course of this disclosure.

From a first aspect thereof, the subject invention resides in apparatus for sawing different kinds of materials, and, more specifically, resides in the improvement comprising, in combination, a supporting frame including a girder-type construction defining an opening for the feed-through of materials to be cut in longitudinal direction by a saw blade, a supporting platform for materials to be cut including a carriage displaceable in longitudinal direction, a clamping arrangement for materials to be cut on the carriage, at least one supporting bracket positioned laterally of the saw blade in front and back regions of the frame and mounted on said carriage, an upper and lower cross-beam for each supporting bracket, with each lower cross-beam being arranged at a distance from the carrier, and vertically movable rods arranged between the upper and lower cross-beam and carrying a clamping device for materials to be cut.

From another aspect thereof, the subject invention resides in apparatus for sawing different kinds of materials, and, more specifically, resides in the improvement comprising, in combination, a supporting frame, a supporting platform for material to be cut displaceable in said supporting frame, a reciprocating saw blade slanted at a free end for a length corresponding to a return stroke of said blade, so that said blade diminishes in width toward said free end, a roller positioned at said free end in a cutting plane, and at a back side, of the saw blade, and having an axle mounted in the supporting frame and extending transversely to said cutting plane, a spring acting on said free end of the saw blade and being connected to the supporting frame for pressing of the saw blade against said roller, and means for articulately mounting the saw blade at a second end opposite said free end.

From a similar aspect thereof, the subject invention resides in apparatus for sawing different kinds of materials, and, more specifically, resides in the improvement comprising, in combination, a supporting frame including a girder-type construction defining an opening for the feed-through of materials to be cut in longitudinal direction, a supporting platform for materials to be cut including a carriage displaceable in longitudinal direction, a clamping arrangement for materials to be cut on the carriage, a reciprocating saw blade mounted in said supporting frame and slanted at a free end for a length corresponding to a return stroke of said blade, so that said blade diminishes in width toward said free end, at least one supporting bracket positioned laterally of the saw blade in front and back regions of the frame and mounted on said carriage, an upper and lower cross-beam for each supporting bracket, with each lower cross-beam being arranged at a distance from the carrier, vertically movable rods arranged between the upper and lower cross-beams and carrying a clamping device for materials to be cut, a roller positioned at said free end of the saw blade in a cutting plane, and at a back side, of the saw blade, and having an axle mounted in the supporting frame and extending transversely to said cutting plane, a spring acting on said free end of the saw blade and being connected to the supporting frame for pressing of the saw blade against said roller, and means for articulately mounting the saw blade at a second end opposite said free end.

BRIEF DESCRIPTION OF THE DRAWINGS

The subject invention and its various aspects and objects will become more readily apparent from the following detailed description of preferred embodiments thereof, illustrated by way of example in the accompanying drawings, in which:

FIG. 1 is an elevation of a reciprocal saw according to a preferred embodiment of the subject invention;

FIG. 2 is a side view of the reciprocal saw of FIG. 1;

FIG. 5 is a view similar to FIG. 1, showing a modification according to a further preferred embodiment of the subject invention;

FIG. 6 is a side view of the reciprocal saw of FIG. 5;

DESCRIPTION OF PREFERRED EMBODIMENTS

Figure 3:
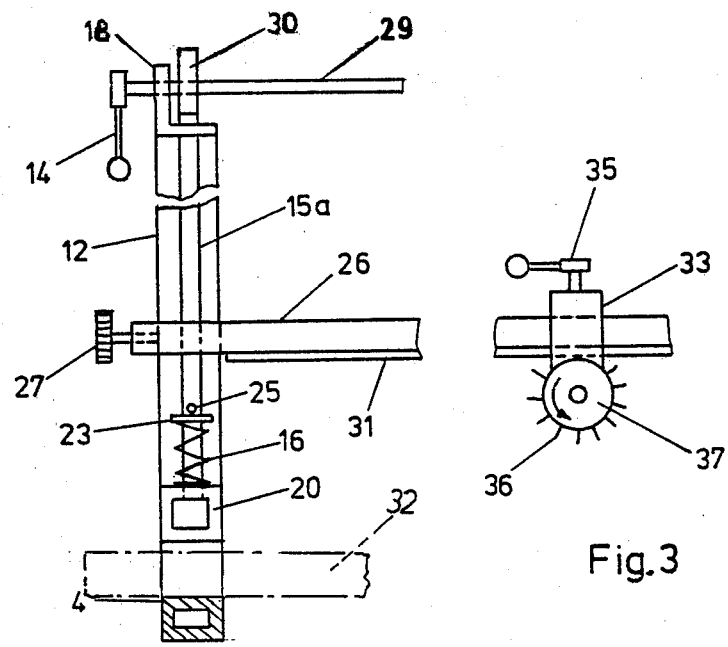
FIG. 3 is a detail view, on an enlarged scale, of a clamping arrangement seen in FIGS. 1 and 2.

The saw according to the illustrated preferred embodiments of the invention is of a reciprocating type, sometimes known as "sabre saw" and herein generically referred to at times as "reciprocating saw." This type of saw typically has a saw blade 1 mounted in the forwardly projecting upper free end of a supporting frame 2 and driven in a usual manner by an electric motor 3 via gearing which converts the rotary motion of the motor 3, which may in given arrangements drive also a hydraulic pump for hydraulic installations, into a stroke movement. The supporting frame 2 has a sawing table or sliding carriage 4 which is movable in the direction of the saw cut and which effects the conveyance or feed of the material to be cut. The supporting frame is at its rear end (i.e. behind the saw blade 1) completely open, thereby leaving an opening 5 for the feeding of work pieces or materials. With the vertical girder-type construction shown in FIGS. 1 and 2, the space in the region of the saw blade also is unobstructed in transverse direction. Due to the design of supporting frame 2 and sliding carriage 4, even long work pieces, such as boards, may be placed transversely on the sliding carriage 4 and may thus be cut.

Two racks 6 and 7 may be provided for the forward propulsion of the sliding carriage 4. They may be provided on the sliding carriage 4 and may cooperate or mesh with corresponding pinions 8 and 9 which are arranged on a shaft 11 in the mounting frame 2.

The advance of the sliding carriage 4 may, for instance, be effected manually by the operator via a handle 10 attached directly to the carriage 4, or then via the shaft 11 having the pinions 8 and 9 attached thereto. The shaft 11, in turn, may be rotated via a suitable connection to a hand wheel or by a motor drive. A hydraulic propulsion via a hydraulic cylinder is also possible.

The material to be cut is clamped fast on the sliding carriage 4 by a clamping arrangement which has support brackets 12 and 13 that are mounted on the sliding carriage 4 laterally of the saw blade 1 in the front and back regions, respectively. Each support bracket 12 and 13 is provided with an upper cross-beam 18 and 19 and with a lower cross-beam 20 and 21, respectively. The two lower cross-beams 20 and 21 are arranged above the sliding carrier 4 at a vertical distance therefrom. This distance is dimensioned so that the usually employed boards may be slid through the gap formed thereby. Longitudinal or vertical rods 15a and 15b are arranged between the upper cross-beam 18 and 19 and the lower cross-beam 20 and 21, respectively. The vertical rods 15a and 15b are longitudinally slidable in bores of the cross-beams. A spring 16 is located between the lower cross-beam 20 and 21 and discs 23 and 24, respectively. The discs 23 and 24 are fixedly located on the longitudinal rods 15a and 15b by a cotter pin 25 which extends through the particular rod 15a or 15b. In this manner, the rods 15a and 15b are resiliently mounted in the cross-beams. At least one clamping strip 26 extends between the rods 15a and 15b. The strip 26 is clamped to the rods 15a and 15b by clamping screws 27 and 28.

Moreover, a rotary shaft or rod 29 extends between the upper cross-beams 18 and 19 and is mounted in cross-beam bores. As seen particularly in FIG. 3, the rotary rod 29 is provided with two eccentric cams 30 located directly above the upper end of the longitudinal rod 15a and 15b, respectively. The rotary rod 29 moreover is provided with a handle 14.

The work piece clamping equipment operates as follows:

The work piece to be sawed or cut is placed on the sliding carriage 4. The clamping strip 26 is then placed onto the work piece. By tightening the clamping screws 27 and 28, the strip 26 is fastened to the two longitudinal rods 15a and 15b. Subsequently, an eccentric clamping action is effected via handle 14. By suitable angular movement of the rotary shaft 29, the eccentric cams 30 depress the longitudinal rods 15a and 15b against the bias of spring 16, whereby the work piece is securely clamped. After completion of a sawing operation on the work piece, springs 16 effect an automatic release of the clamping apparatus. For an improved clamping action, the clamping strip 26 may be provided with an elastic layer, such as of rubber, on its lower side.

Figure 4:
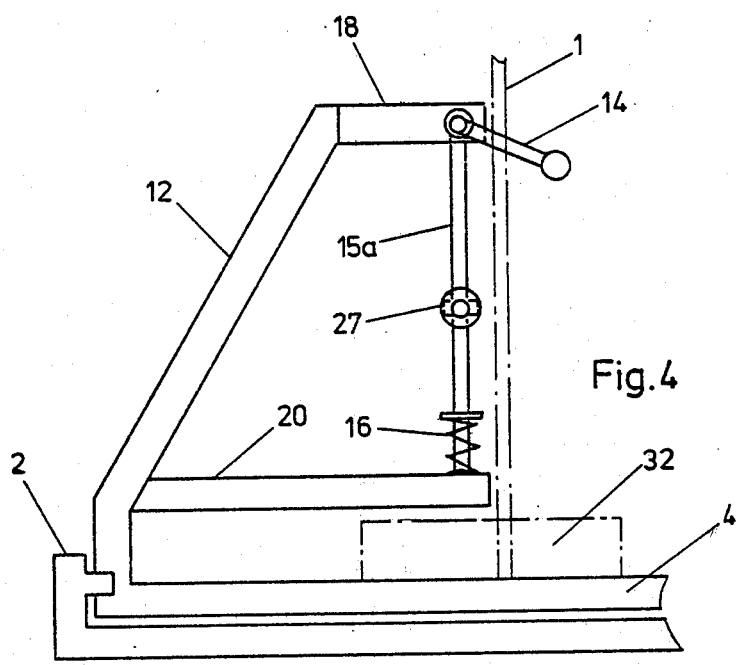
FIG. 4 is an elevation of the clamping arrangement according to the detail view of FIG. 3.

As seen especially in FIGS. 3 and 4, a board 32, indicated in dotted lines, may longitudinally be slid through in a simple manner at any desired length, by virtue of the distance between the sliding carriage 4 and the lower cross-beams 20 and 21, respectively. If necessary for reasons of stability, the lower cross-beams 20 and 21 may be correspondingly extended beyond the mid-portion of the frame and an additional support, shown in dotted lines in FIG. 1, may be provided on the other side of the sliding carriage 4.

Instead of a disc 23, on which the spring 16 rests, a cross-pin, notch or corresponding stepped portion of the longitudinal rod 15a may be employed.

A rotatable roller 37 may be clampable on the strip 26 in order to facilitate a sawing of wood in longitudinal direction. The roller 37 is arranged with its axis of rotation extending horizontally and transversely to the cutting plane. A clamping screw 34 as shown in FIG. 2, or an eccentric clamping device 35 as shown in FIG. 3, may serve the clamping of the roller 37 with a suitable mount 35 on the clamping strip 26.

If now, for instance, a long board is to be sawed longitudinally, it is merely necessary to lower the clamping strip 26 to such an extent that the roller 37 lies on the board 32. If desired, the roller 37 may be equipped with a drive motor (not shown). In this manner, the board 32 may be transported by a powered drive or automatically. As drive motor, there may, for instance, be employed a hydraulic motor which is connected by a suitable hydraulic line to a hydraulic pump which is preferably driven by motor 3.

For an improved propulsion of the work piece being sawed, the roller 37 may at its circumference be provided with teeth, points 36 or the like.

The reciprocal saw may be moved as desired with the aid of a pair of retractable swing-out wheels 17 mounted on the supporting frame 2.

The saw blade 1 has a foundation onto which hard metal cutting plates 24 are brazed in such a manner as to effect a cutting action during the downward stroke of the saw blade.

Reference may now be had to FIGS. 5 to 13 for further embodiments according to the invention.

Figure 7:
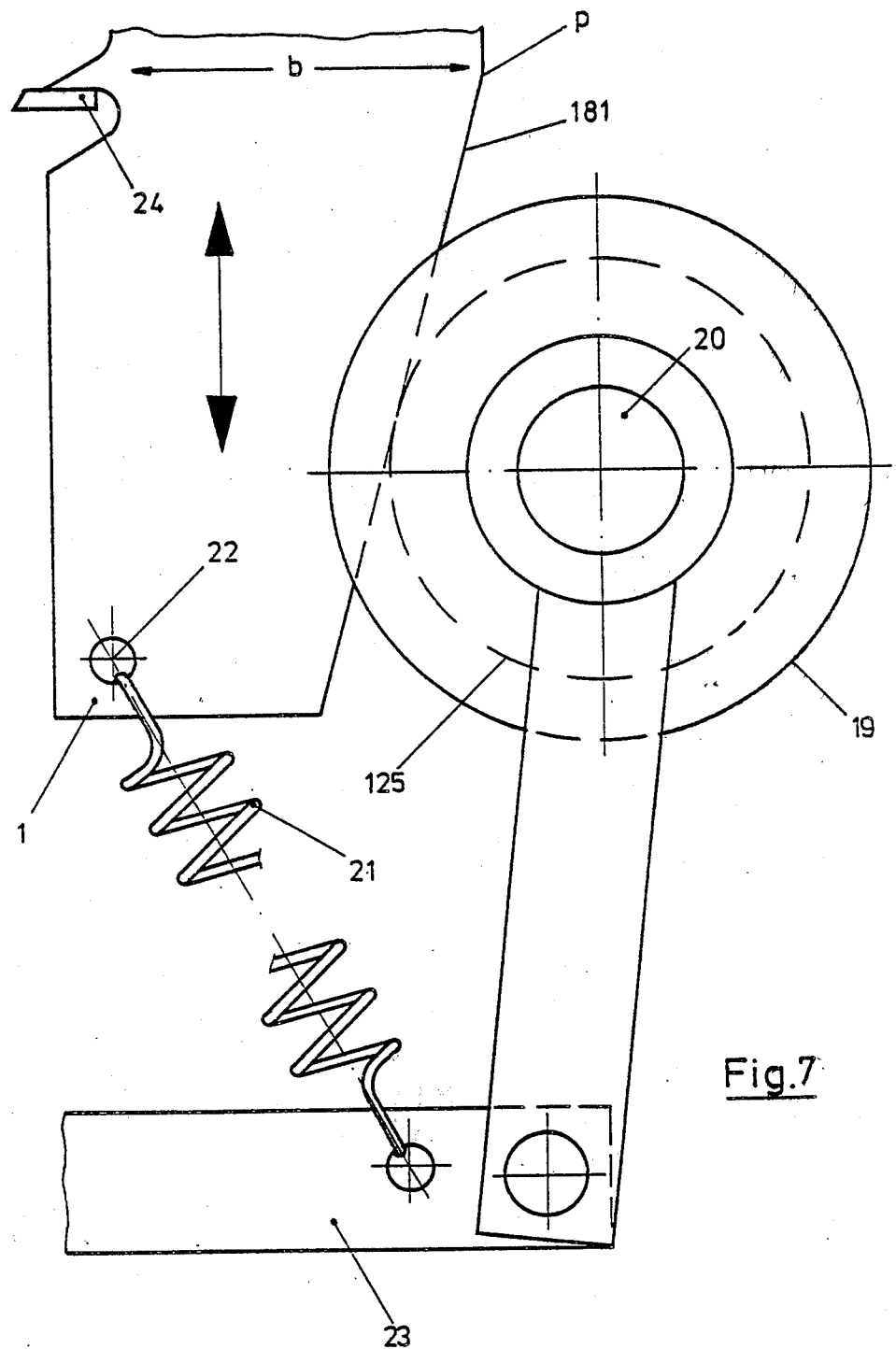
FIG. 7 is a detail view, on an enlarged scale, of the lower region of the saw as seen in FIG. 6.

The saw blade 1 shown in FIG. 6 in a customary manner has a constant width b over almost its entire length. Only in its lower region does the saw blade possess a beveled or chamfered edge, or a slant, which in length corresponds at least to the return stroke of the blade. Moreover, a pulley or roller 19 is rotatably mounted in that region and is located on an axle 20 in the supporting frame 2. Further particulars are seen in FIG. 7. A spring 21 acts on and is with one end attached to the lower end of the saw blade 1 in a bore 22 and with its other end to a mounting support of the frame 2. By virtue of this arrangement, there results a traction on the saw blade 1 directed away from the material to be cut.

The bevel or slant 181 and spring 21 effect a release of the saw blade 1 and a retraction thereof from the work piece. FIG. 3 shows the saw blade 1 approximately in the middle position of its stroke. When the saw blade is in its lowermost position, then the point P is approximately level with the axle 20 of the roller 19. If now the upward stroke of the saw blade 1 commences, then it is forced away from the material 5 to be cut, by virtue of the bevel or slant 181 and by force of the spring 21. To this end it is necessary that the saw blade is pivotally or flexibly mounted at its upper end or clamping point.

The roller 19 moreover has a circumferential groove 125 on its rolling surface. In this peripheral groove 125, the saw blade 1 slides with its backside and in this manner is securely guided by the lateral walls of the circumferential groove 125. Stability and cutting accuracy of the saw are thereby increased.

Beside the main function of the spring or springs 21, namely the recurring retraction of the saw blade, such spring serves a further purpose. In particular, the spring is stretched or tensioned during the return stroke, that is in the idling condition of the motor and is thus enabled to effect during the forward or downward stroke of the saw blade a relief of the motor, since the spring force or bias then acts additionally in the forward travel or downward direction of the spring. In practical terms, this means that the motor is not loaded as much or, if desired, may be dimensioned for lower output power.

Wood pieces which are to be cut longitudinally, such as planking or molding boards, may in a simple manner be pushed through from the front.

Figure 8:
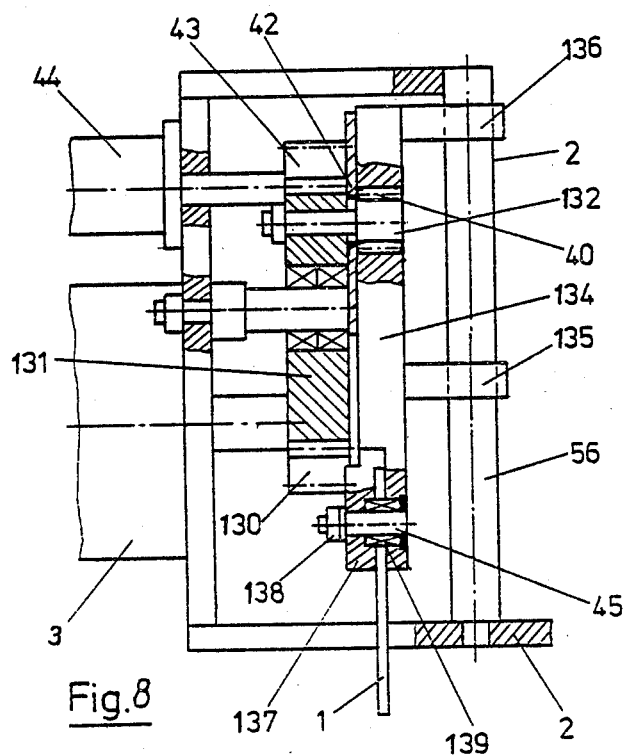
FIG. 8 is a section, on an enlarged scale, of the reciprocal drive illustrated at the top of FIGS. 1, 2, 5 and 6.
Figure 9:
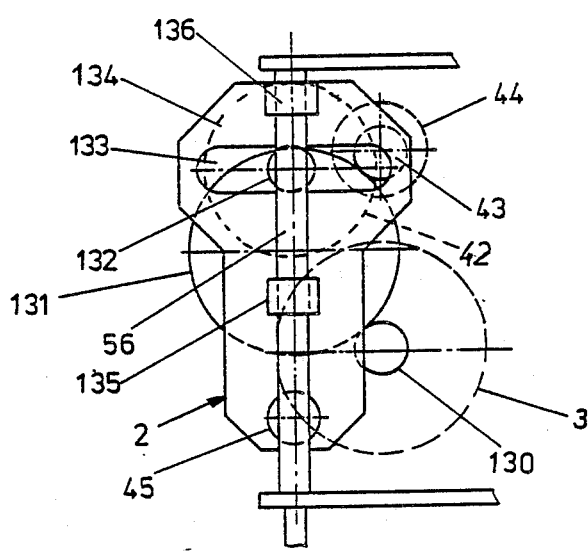
FIG. 9 is an elevation of the reciprocal drive shown in FIG. 8.

FIGS. 8 and 9 show the reciprocating drive 2 in further detail. This drive is conventionally composed of a crank gear or crankshaft assembly comprising a pinion 130 driven by the motor 3 and a gear wheel 131 meshing with the pinion 130 and having a guide bolt 132. The guide bolt or cross-pin 132 slides in a slot 133 of a carrier plate 134. The carrier plate 134 is provided with two bushings or guide bearings 135 and 136 which are located one above the other in the cutting plane. The bushings 135 and 136 slide on a tube 56 which is attached to the supporting frame 2 of the saw and extends in the cutting plane. In this manner, a reciprocating movement of the carrier plate 134 is effected.

The saw blade 1 is connected to the carrier plate 134 in an articulate manner via a clamping plate 137 provided with a screw 138 and a bearing 139. The saw blade 1 is itself pivoted on a bolt 45. Instead of the bearing 139, a simple sliding guide may self-evidently be provided.

The guide bolt 132 is provided with a bearing 40. A bronze disc 42 is located between the carrier plate 134 and the gear wheel 131, whereby the carrier plate 134 is well guided with the bushings 135 and 136.

If the carriage or saw table 4 is equipped with a hydraulic drive, a hydraulic pump 44 may further be driven via a pinion 43 and may propel the saw table 4.

Figure 10:
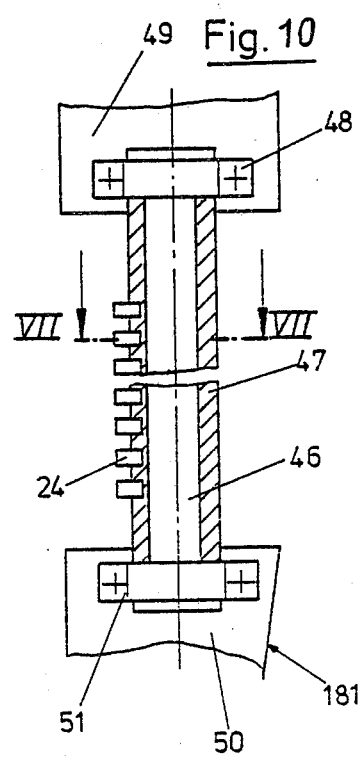
FIG. 10, is an elevation, partially in section and on an enlarged scale, of a saw blade structure according to an embodiment of the subject invention.
Figure 11:
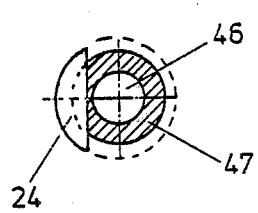
FIG. 11 is a section along the line VII—VII of FIG. 10.

In FIGS. 10 and 11 an embodiment of the invention is shown for a saw blade with which curved cuts may be made, as with a scroll saw. The saw blade according to this embodiment includes a spring steel rod 46 as a core surrounded or enclosed by a jacket bushing 47 carrying a plurality of cutting plates or bits 24. These bits 24 are preferably brazed on the jacket 47. The bits 24 may be mounted in a simple manner by providing the jacket 47 with corresponding cuts or notches in which the bits are inserted to be brazed therein. The bits 24 thereby may have any desired form or shape.

At the upper end, the spring steel rod 46 and jacket 47 are attached or clamped via a clamp 48 on a head 49, whereby a firm connection is simultaneously created between the spring steel rod 46 and the jacket 47.

The saw blade shown in FIG. 10 includes a terminal piece 50 attached to the lower end of the steel spring rod 46 and jacket and being slanted as at 181 at a free end thereof. The attachment of the terminal piece 50 to the lower end of the steel spring rod 46 and jacket 47 takes place in the same manner via a clamp 51. For a return movement of the saw blade according to the invention, the terminal piece 50 also is provided with a slant 18 on its back side.

Instead of a clamp attachment of the saw blade at the head 49 and terminal piece 50, other fastening means may be employed within the scope of the invention. In case of wear of the bits 24, the jacket 47, together with the worn bits may be removed and exchanged against a new part in a simple manner.

Within the scope of the invention, the bits may be formed as entirely round discs, as indicated in dotted outline in FIG. 11. In this case, the jacket is formed as a plurality of short sections with interdigitated cutting plates.

Figure 12:
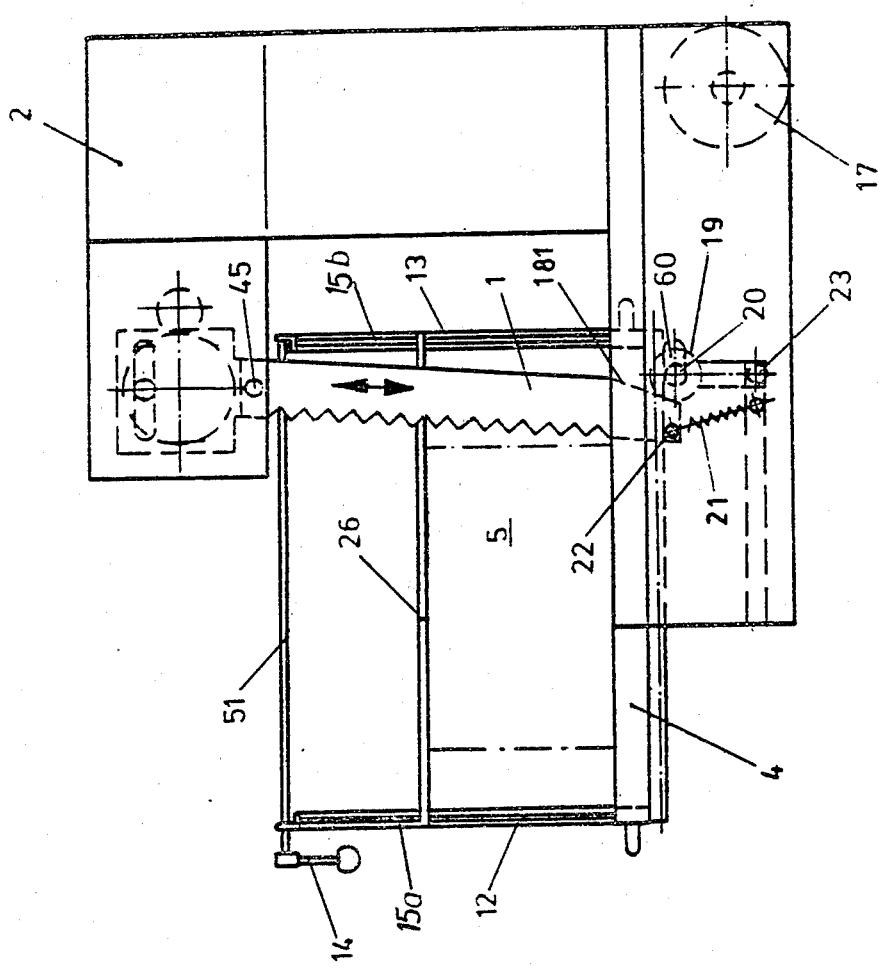
FIG. 12 is a view similar to FIG. 5, showing a modification according to a further preferred embodiment of the subject invention.

The embodiment shown in FIG. 12 is of essentially like construction as the embodiment described above, so that like reference numerals have been employed. In the embodiment of FIG. 12, the axle 20 and thereby the roller 19 is transposed forwardly by a small amount, whereby the slanted position of the saw blade is amplified. The slant of the saw blade is strongest in the lowest reciprocating position of the saw blade, that is at the end of the saw blade stroke.

Figure 13:
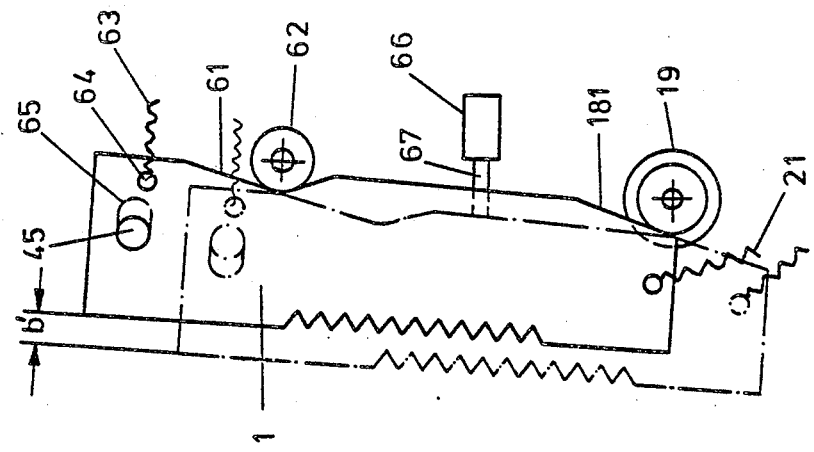
FIG. 13 is a detail view, on an enlarged scale, of a saw blade structure and guidance system which may, for example, be employed in the saw of FIG. 12 according to a further preferred embodiment of the subject invention.

Oblong holes 60 on both sides of the supporting frame 2 enable an adjustability of the axle 20. In the embodiments of FIGS. 12 and 13, the saw blade thus is slanted forward toward material to be cut relative to a vertical line through the second or upper end of the saw blade at 45. In particular, the saw blade may, for instance, be slanted by the position of the roller 19.

In FIG. 13 an embodiment is shown in which the saw blade 1 also in its upper region spaced from its free end has a second slant or indentation 61 which in terms of dimension and angular position corresponds to the first slant 181 in the lower region of the saw blade. The saw blade is shown on an enlarged scale, with its length having been foreshortened for reasons of space. In the region of the indentation 61, there is provided at the back side of the saw blade a roller, wheel, rod 62 or the like mounted in a part of the supporting frame of the reciprocating saw. This in similarity to the roller 19. Similarly, a spring 63 biases the saw blade 1 in its upper region for the same purpose as the spring 21. While one end of the spring 63 rests at the supporting frame, the other end is suspended in a bore 64 of the saw blade. In this manner, a retractive force also exists in the upper region of the saw blade 1 and applies the saw blade with a continuous pressure to the roller 62. Accordingly, the spring 63, acting on an upper region of the saw blade, applies this saw blade to the second roller 62.

By virtue of this feature, the saw blade is retracted in a parallel fashion from the work piece to be sawed during its return stroke by a width b' in proportion to the angular degree of the slant. To this end, it is merely necessary that the mounting or suspension with which the saw blade 1 is connected to the reciprocating drive according to FIGS. 12 and 13 is adjustable in the cutting direction of the saw. To this end, the bolt 45 may be located in an oblong hole of a part of the reciprocating drive. For instance, the oblong hole may be provided in the carrier plate 134 or the clamping plate 137. Alternatively or additionally, the oblong hole may be provided in the saw blade itself. FIG. 13 shows the oblong hole at 65 in dotted outline.

If necessary, the roller 62, for a better guidance of the saw blade 1, may also have a circumferential groove, similar to the circumferential groove 125.

In FIG. 13 the saw blade is shown in its upper position immediately prior to the start of the downward work stroke, or at the end of its return stroke. The dotted representation of the saw blade shows the position which it assumes at the end of the work stroke. Since the saw blade defines a relative motion in the cutting direction (by the width b') a sensing device 66 may in a simple manner be arranged at the saw blade. This sensing device has a saw blade position sensor 67 extending in cutting direction at the saw blade to enable control of the advance of the saw table or carriage 4.

For example, a switching device connected to the sensing device 66 may be employed for terminating the displacement or advance of the saw table 4 at the end of the work stroke when the saw blade is located in its lowest position and the sensor 67 projects to a maximum extent from the device 66. In this manner, the hard metal cutting plates are protected from wear during the return stroke.

In practice, the work pieces to be sawed or cut are positioned on the sliding carriage 4 and are clamped thereon. For the sawing operation, the carriage 4 is merely displaced in cutting direction. This may be effected with a manual drive with adequate transmission, or through a direct displacement of the carriage or then through a hydraulic or electric motor drive.

By virtue of the girder-type construction of the housing or frame of the illustrated saw, with the saw blade being preferably mounted in the forwardly projecting portion of the upper part of the housing or frame, and due to the through-put opening effective in longitudinal direction, long boards, for instance, may be cut transversely as well as put through the machine longitudinally. Since the lower cross-beams 20 and 21 are positioned above the sliding carriage 4 at a distance therefrom, and since the two support brackets 12 and 13 are attached laterally in the front and rear region of the carriage 4, boards of desired lengths may be cut. To this end, it is merely necessary to slide the boards in longitudinal direction through the machine, without actuation of the clamping equipment.

According to illustrated embodiments of the subject invention, a load reduction on, or relaxation of, the saw blade during the return stroke is accomplished in a simple manner. By virtue of the fact that the width of the saw blade diminishes at the free end thereof, and that the saw blade is pulled back by a spring, the saw blade can remove itself slightly from the material to be cut, thereby being temporarily removed from the load. Due to the illustrated slant 181, the saw blade is pulled backward by the spring from the material to be cut in the lower region where the teeth do not cut.

By provision of a slant at the back side of the blade, the saw blade is thus simply and effectively subjected to load reduction during the return stroke. In this manner, the saw teeth or bits are not pulled out during the sawing of hard materials. When soft materials are sawed, sawdust or shavings may readily fall out of the cut because of the mentioned retraction of the saw blade during the return stroke.

As a further advantage, the spring or springs 21 and/or 63 serve as vibration equalizers and dampen oscillations of the saw blade.

Surprisingly, a fracture or breaking out of the material at the end of the saw cut is practically eliminated, if the saw blade, as shown in FIGS. 12 and 13, is slightly slanted relative to the vertical. Otherwise, there exists the danger that material to be cut is broken off objectionably, as the saw blade exerts pressure whereby material tends to break out within the final centimeters of a saw cut.

Proportionably to the degree of slant, such as of the slant 181, the saw blade is progressively slanted forwardly as the working stroke progresses. This is accomplished with the roller 19 which guides or presses the saw blade forwardly; that is, in the direction of the sawing operation. There is thus, at the beginning of a working stroke, a slightly slanted position of the saw blade which is increased in the course of the stroke. The degree of slant to which the saw blade is adjusted depends on the particular situation or material to be sawed, and is easily determined empirically.

A very substantial advantage in terms of simplicity of saw blade clamping or suspension and drive results from the guidance of the saw blade by the roller 19 or rollers 19 and 62 and/or from the load discharge or removal effected by the tension or bias of the spring 21 or springs 21 and 63. In this manner, it is possible according to an embodiment of the invention that the saw blade at its clamping or suspension side is articulately mounted in a carrier plate 134; with such carrier plate preferably having guide bushings 135 and 136 located one after or above the other in the cutting plane and sliding on or encompassing a tube 56 extending in the cutting plane of the saw blade or parallel therto. The carrier plate 134 may have a slot 133 where it is engaged by a guide bolt or cross pin 132 of a crank drive. In comparison to the proposal according to the above mentioned German utility Model No. 77 02 782, which suggests a saw blade mounting or guidance system with two tubes equipped with slide bushings which, additionally, have to be articulated for reasons of tolerance, embodiments of the subject invention enable operation with only one tube extending parallel to the cutting plane, by virtue of the lower support of the saw blade disclosed herein.

With the aid of the disc 42 and the two bushings 135 and 136 at the tube 56, the carrier plate 134 is perfectly mounted and guided without problems. In this manner, tolerance inaccuracies may further be equalized.

If now the saw blade in its upper region, as seen in FIG. 13 according to an embodiment of the subject invention, is provided with an indentation or slant 61, a roller or guide 62 and a spring 63 as in its lower region, and the mount of the saw blade is made adjustable in the direction of the saw cut, then the danger of a fracture or breaking out of the saw teeth, particularly in the upper region, is still further diminished. In particular, instead of a pendulum movement of the saw blade, the blade 1 is now retracted in a parallel fashion; namely, in proportion to the reduction of its width b due to the slant or indentation.

The features herein disclosed with the aid of any of the FIGS. 5 and 6, 7, 8 and 9, 12 and/or 13 are of independent significance, and have utility separate from, the other embodiments herein disclosed. Alternatively, any of these features may be combined with the features of the other embodiments, such as those of FIGS. 1 and 2 and/or 3 and 4.

The same applies in principle and in practice to the saw blade construction and structure according to FIGS. 10 and 11.

In particular, a very advantageous construction of the saw blade according to a further embodiment of the subject invention resides in the provision of a round spring steel rod 46 as saw blade foundation or core, which is surrounded or enclosed by a bushing or jacket 47 on which the cutting plates or bits 24 are mounted or attached, and in the equipment of such saw blade with a chucking part or head 49 at one end and with an end piece at its other, free end; with such end piece 50 being provided on its back side with a slant or taper extending toward its own free end.

This construction or configuration of the saw blade also is enabled by its being supported at its free end according to embodiments of the subject invention. Since no cutting plates or bits may be brazed onto the spring steel rod 46, the jacket 47 is provided thereon. The jacket 47 thus accepts the bits 24. If the head 49 and the end or terminal piece 50 are correspondingly configured, conventional as well as novel saw blades, such as the saw blade according to FIGS. 10 and 11, may be utilized in the same saw or cutting apparatus. The novel round or cylindrical saw blades according to FIGS. 10 and 11 advantageously permit the execution of curved cuts or scrolls. For instance, semi-circular openings in wall stones for pipes and the like may be cut in a close-fitting fashion. In this manner, defects in the insulating or tightness structure of the wall, caused by excessive apertures or break-outs, as provided so far by manual knock-out methods, are elegantly avoided.

The features of the subject invention and its embodiments are of special utility with respect to reciprocating saws, which—within the spirit and scope of the subject invention—include saw types wherein a saw blade executes essentially a linear up and down or forward and backward movement or stroke. This includes, for instance, saws with strapped free ends.

While specific embodiments and aspects of the invention have been herein disclosed and shown, this subject extensive disclosure suggests or renders apparent to those skilled in the art various modifications and variations within the spirit and scope of the invention.

I claim:

1. In apparatus for sawing different kinds of materials, the improvement comprising in combination:
   a supporting frame including a girder-type construction defining an opening for the feedthrough of materials to be cut in longitudinal direction by a saw blade;
   a supporting platform for materials to be cut including a carriage displaceable in longitudinal direction;
   a clamping arrangement for materials to be cut on the carriage;
   supporting bracket means positioned laterally of the saw blade in front and back regions of the frame and mounted on said carriage;
   an upper and lower cross-beam for each supporting bracket, with each lower cross-beam being arranged at a distance from the carriage platform; and
   vertically movable rods arranged between the upper and lower cross-beams and carrying a clamping device for materials to be cut.

2. Apparatus as claimed in claim 1, wherein:
   said clamping device includes a horizontal clamping strip extending between said vertically movable rods and being clampable to said rods; and
   an eccenter tensioning device for said rods.

3. Apparatus as claimed in claim 2, wherein:
   said eccenter tensioning device includes a rotary rod mounted in the upper cross-beams and having eccentric cams located above upper ends of said rods.

4. Apparatus as claimed in claim 3, wherein:

each of said rods is equipped with a spring located between the lower cross-beam and a disc connected to the particular rod.

5. Apparatus as claimed in claim 1, 2 or 3, wherein:
said clamping strip has an elastic layer on a lower side thereof.

6. Apparatus as claimed in claim 1, 2 or 3, including:
a rotatable roller attachable to said clamping strip, with an axis of rotation of the roller extending horizontally and transversely to the cutting plane.

7. Apparatus as claimed in claim 6, wherein:
said roller is connected to a drive motor.

8. Apparatus as claimed in claim 7, wherein:
said drive motor is a hydraulic motor.

9. Apparatus as claimed in claim 6, wherein:
said roller has teeth at its circumference.

10. Apparatus as claimed in claim 6, including:
means for clamping said roller to the clamping strip.

11. Apparatus as claimed in claim 10, wherein:
said means for clamping said roller include an eccentric clamping device.

12. In apparatus for sawing different kinds of materials, the improvement comprising in combination:
a supporting frame;
a supporting platform for material to be cut displaceable in said supporting frame;
a reciprocating saw blade slanted at a free end for a length corresponding to a return stroke of said blade, so that said blade diminishes in width toward said free end;
a roller positioned at said free end in a cutting plane, and at a back side, of the saw blade, and having an axle mounted in the supporting frame and extending transversely to said cutting plane;
a spring acting on said free end of the saw blade and being connected to the supporting frame for pressing of the saw blade against said roller; and
means for articulately mounting the saw blade at a second end opposite said free end.

13. Apparatus as claimed in claim 12, wherein:
said saw blade is slanted forward toward material to be cut relative to a vertical line through said second end.

14. Apparatus as claimed in claim 13, wherein:
said saw blade is slanted by the position of said roller.

15. Apparatus as claimed in claim 12, 13 or 14, wherein:
said roller has a circumferential groove for guiding said back side of the saw blade.

16. Apparatus as claimed in claim 12, 13 or 14, wherein:
said saw blade is articulately mounted at said second end in a carrier plate having bushings located in said cutting plane and sliding on a tube extending parallel to said cutting plane; and
said carrier plate has a slot in which a guide bolt of a crank gear slides.

17. Apparatus as claimed in claim 16, wherein:
said crank gear has a gear wheel and a guide for the carrier plate including a disc between the carrier plate and the gear wheel.

18. Apparatus as claimed in claim 12, 13 or 14, wherein:
said saw blade has a first slant at said free end and a second slant in an upper region spaced from said free end, with said second slant corresponding in terms of dimension and angular position to said first slant;
A second roller is disposed at the back side of the saw blade at said second slant and corresponds in position and function to the first-mentioned roller;
said mounting means are adjustable in the cutting direction of the saw blade; and
a second spring, acting on an upper region of the saw blade, applies the saw blade to said second roller.

19. Apparatus as claimed in claim 18, wherein:
said mounting means include a bolt connecting the saw blade to a reciprocating drive and being positioned in an oblong hole of a part of said reciprocating drive.

20. Apparatus as claimed in claim 18, wherein:
said mounting means include a bolt connecting the saw blade to a reciprocating drive and being positioned in an oblong hole in the saw blade.

21. Apparatus as claimed in claim 12, 13 or 14, including:
means for terminating the displacement of said supporting platform, including a saw blade position sensor extending in cutting direction at the saw blade.

22. Apparatus as claimed in claim 12, 13 or 14, wherein:
said saw blade includes a steel spring rod as a core surrounded by a jacket carrying a plurality of bits, and a terminal piece attached to a lower end of said steel spring rod and jacket and being slanted at a free end thereof; and
said steel spring rod and jacket are attached to a head at an upper end thereof.

23. In apparatus for sawing different kinds of materials, the improvement comprising in combination:
a supporting frame including a girder-type construction defining an opening for the feedthrough of materials to be cut in longitudinal direction;
a supporting platform for materials to be cut including a carriage displaceable in longitudinal direction;
a clamping arrangement for materials to be cut on the carriage;
a reciprocating saw blade mounted in said supporting frame and slanted at a free end for a length corresponding to a return stroke of said blade, so that said blade diminishes in width toward said free end;
supporting bracket means positioned laterally of the saw blade in front and back regions of the frame and mounted on said carriage;
an upper and lower cross-beam for each supporting bracket, with each lower cross-beam being arranged at a distance from the carriage platform;
vertically movable rods arranged between the upper and lower cross-beams and carrying a clamping device for materials to be cut;
a roller positioned at said free end of the saw blade in a cutting plane, and at a back side, of the saw blade, and having an axle mounted in the supporting frame and extending transversely to said cutting plane;
a spring acting on said free end of the saw blade and being connected to the supporting frame for pressing of the saw blade against said roller; and
means for articulately mounting the saw blade at a second end opposite said free end.

* * * * *